United States Patent [19]

Dilling

[11] Patent Number: 4,743,268
[45] Date of Patent: May 10, 1988

[54] DISPERSANT COMPOSITION FOR AZO DYESTUFFS CONTAMINATED WITH SOLUBLE COPPER IMPURITIES

[75] Inventor: Peter Dilling, Isle of Palms, S.C.

[73] Assignee: Westvaco Corporation, New York, N.Y.

[21] Appl. No.: 875,204

[22] Filed: Jun. 17, 1986

Related U.S. Application Data

[63] Continuation-in-part of Ser. No. 859,384, May 5, 1986, Pat. No. 4,715,864.

[51] Int. Cl.$^4$ .............................................. C09B 67/00
[52] U.S. Cl. .......................................... 8/557; 8/590; 8/597; 8/600; 8/624; 530/505
[58] Field of Search .................... 8/600, 597, 557, 590

[56] References Cited

U.S. PATENT DOCUMENTS

| | | | |
|---|---|---|---|
| 2,594,302 | 4/1952 | Ehrensperger | 530/505 |
| 3,412,018 | 11/1968 | Monzie | 530/505 X |
| 3,455,895 | 7/1969 | Niild-Rama et al. | 530/505 |
| 4,666,528 | 5/1987 | Arrington et al. | 252/82 |
| 4,715,864 | 12/1987 | Dilling et al. | 8/557 |

OTHER PUBLICATIONS

E. R. Trotman, "Dyeing and Chemical Technology of Textile Fibres", (Sixth Edition), Wiley, 1984, pp. 144-145.

*Primary Examiner*—A. Lionel Clingman
*Attorney, Agent, or Firm*—Terry B. McDaniel; Richard L. Schmalz

[57] ABSTRACT

An improved composition for use as a dispersant in azo dye systems contaminated with soluble copper impurities comprising an amine lignosulfonate salt and ethylenediaminetetraacetic acid. Preferably, the ethylenediaminetetraacetic acid is employed in an amount of about 1 to about 4 moles per each molar amount of the copper present in the system, per 1,000 grams of the lignosulfonate. Also disclosed is an improved azo dye system containing an amine lignosulfonate salt and ethylenediaminetetraacetic acid, and an improved method of dyeing materials with copper-contaminated dye systems containing azo dyestuffs and lignosulfonate salts wherein the azo dye reduction effect is alleviated by utilizing as the lignosulfonate salt an amine salt thereof, together with ethylenediaminetetraacetic acid.

13 Claims, No Drawings

DISPERSANT COMPOSITION FOR AZO DYESTUFFS CONTAMINATED WITH SOLUBLE COPPER IMPURITIES

This application is a continuation-in-part of my co-pending, commonly assigned U.S. patent application Ser. No. 06/859,384 filed May 5, 1986 now U.S. Pat. No. 4,715,864, issued Dec. 29, 1987.

The present invention relates to an improved dyestuff composition and, more particularly, to an improved dyestuff composition containing an azo dye and a sulfonated lignin dispersant. The invention also relates to an improved method of dyeing with a dye system containing an azo dyestuff and a lignosulfonate salt dispersant wherein azo dye reduction caused by the added presence of copper metal contaminants in the dye system is greatly alleviated.

BACKGROUND OF THE INVENTION

Dyestuff compositions are widely employed to color natural and synthetic fibers. Such compositions generally contain, in addition to a dyestuff component, a dispersant for the dyestuff. In the dyestuff composition, the dispersant generally serves three basic functions:

(1) it assists in reducing the dye particles to a fine size in a grinding operation;

(2) it maintains the dispersing medium for the dyestuff; and (3) it serves as a diluent.

Sulfonated compounds are frequently employed as dye dispersants and may be obtained from two major sources, sulfonated lignins from the wood-pulping industry prepared from the lignin by-products of a sulfite or a kraft pulping process, and napthalene sulfonates derived as by-products from the petroleum industry.

In a kraft pulping process, lignin is obtained as a by-product from the spent pulping liquor, known as black liquor, where lignocellulosic materials, such as wood, straw, cornstalks, bagasse, and the like are processed to separate the cellulosic pulp from the lignin. In kraft pulping, the wood is subjected to the effects of strong alkali wherein the lignin forms a soluble sodium salt in the alkaline region which is separated from the cellulose and dissolves in the pulping liquor. The lignin is then recovered from the black pulping liquor by reducing the pH of the liquor to precipitate the lignin therefrom.

Lignin obtained from the kraft, soda, or other alkaline processes is not recovered as a sulfonated product, but is sulfonated, if desired, by reacting the material with a bisulfite or sulfite compound. Sulfonated lignins are understood to be lignins containing at least an effective amount of sulfonate groups to give water-solubility in moderately acid and higher pH solutions. The advantages of employing sulfonated lignins as dispersants in dyestuff compositions are due to their unique physical properties which include good capability to many dye systems, outstanding dispersant characteristics at ambient and elevated temperatures, and availability. There are, however, certain disadvantages in employing such lignins, whether sulfite process-derived lignins, or sulfonated kraft lignins, as dispersants. One negative factor in the use of lignins as dyestuff additives is that certain salts of the sulfonated lignins, particularly sodium and ammonium salts, tend to cause oxidative reduction and a color loss in dye systems using azo dyestuffs in the dyeing operation.

Color loss in the use of sulfonated lignins in azo dyestuff systems is caused by the action of the sulfonated lignins upon the —N═N— azo groups in the dyestuff. Elimination of the nitrogen double bond by reduction to the hydrazo structure will cause loss of color, and if carried to complete rupture, will cause a destruction of the color body itself. In kraft lignins, functional groups capable of complex formation, such as catechol and phenol, can undergo numerous reactions in the presence or absence of oxygen which have the potential to reduce the azo dye color body.

The azo dye reduction caused by the use of lignosulfonate salts as dispersants in azo dye-containing systems is greatly increased when such azo dye systems contain soluble copper impurities. Soluble copper contaminants present in the dye system tend to catalyze the oxidative lignin reactions, thereby further aggravating azo dye reduction and color loss caused by the sulfonated lignins. Copper impurities may enter a dye system in the dyestuff itself, in additives applied to the system, or by contamination of the dye system from piping and handling vessels. Ionic copper by itself in the absence of lignin can undergo weak chelation with certain dyestuffs which results in shade distortions. While ethylenediaminetetraacetic acid (EDTA), a strong chelate compound, can alleviate azo dye reduction by metals, it is only moderately effective when employed in combination with sodium or ammonium lignosulfonate salt dispersants. This is due to the fact that the lignosulfonates are chelates themselves and therefore capture a portion of the metal salt impurities, that is, quantities of copper ion will remain in association with functional groups in the lignin molecule, such as the catechols and phenols.

BRIEF OBJECTS OF THE PRESENT INVENTION

It is an object of the present invention to provide an improved dyestuff composition employing an azo dyestuff and a sulfonated lignin dispersant which has reduced tendency for azo dyestuff reduction and color loss.

It is another object to provide a sulfonated lignin dispersant composition for use in azo dyestuff-containing dye systems, particularly those which contain soluble copper contaminants therein, wherein the tendency of the dispersant and the metal contaminants to reduce the azo dye structures of the dyestuff are greatly alleviated.

It is another object to provide an improved method of dyeing with a dyestuff composition containing an azo dyestuff and a lignosulfonate dispersant which provides improved azo group stability and reduced color loss in the dyeing operation.

SUMMARY OF THE INVENTION

The present invention is directed to the formulation and use of a dye system composition comprising an azo dyestuff (also referred to as an azo dye system), an amine lignosulfonate salt, of the type described in my aforesaid co-pending application, and ethylenediaminetetraacetic acid (EDTA). The dye system composition, in combination, greatly alleviates azo dye reduction by the lignosulfonate and undesirable copper contaminants which may be present therein.

Surprisingly, it has been found that the combination of an amine salt lignosulfonate and EDTA produces a synergistic effect in sequestering the catalytic action of copper contaminants which may be present in the dye system to aggravate azo dye reduction by the sulfonated lignin dispersant.

DETAILED DESCRIPTION OF PREFERRED EMBODIMENTS

In my co-pending commonly assigned U.S. patent application Ser. No. 06/859,384 filed May 5, 1986, the disclosure of which I incorporate herein by reference, I have found that amine salts of lignosulfonates cause less azo dye reduction when used as a dispersant than do sodium and ammonium lignosulfonate salt dispersants.

As described in my co-pending application of which this application is a continuation-in-part, amine lignosulfonate salts which may be employed in the present invention may be produced from the lignin by-product of the black liquor residue of a kraft pulping process. For recovery and preparation, the pH of the black liquor residue is lowered from an initial pH level of around 13 to around 10.5 to 9, at which point the lignin precipitates from the black liquor. The precipitated lignin slurry is then reacted with an aldehyde compound, such as formaldehyde, to methylolate the same, after which the lignin slurry is acidified with sulfuric acid to a pH of about 2 to 3 where it is water-washed to remove inorganic salts and other impurities therefrom.

The methylolated lignin is thereafter reacted with an organic amine and sulfur dioxide, preferably at a pH of around 6.3 to 6.5, to form the sulfomethylated lignin amine salt. Organic amine compounds which may be employed in preparation of the lignin amine salts of the present invention include trimethylamine, triethylamine, triethanolamine, diethanolamine, dimethylamine, monoethanolamine, and the like. Preferably, triethanolamine is employed.

The effectiveness of amine lignosulfonate dispersants in combination with EDTA to alleviate azo dye reduction in azo dyestuff systems containing copper impurities may be illustrated by testing and comparing various dye compositions for color loss.

Color degradation tendencies were determined in accordance with an azo dye color reduction test procedure. Azo dispersed dye slurries were prepared by mixing one gram of the selected dyestuff and one liter of distilled water. One gram samples of selected lignin salts are placed into 125 milliliters of water. (This represents about a ten-fold excess over the amount of lignosulfonate normally employed in order to detect even slight differences in azo dye reduction.) 100 milliliters of the dye slurry is added to each aqueous lignin sample and certain of the dye/lignin samples variously modified by addition of measured amounts of copper metal impurities and EDTA. The pH of each dye/lignin sample composition is adjusted to a desired level and five grams of a pre-scoured Dacron (Type 54) yarn skein is immersed in each dye/lignin sample. Each yarn-containing sample is placed in a Renigal Dye Control Machine, Model PR, which is heated to 80° C. After 15 minutes, the temperature is raised to 130° C. and held at this temperature for 45 minutes (15 minutes is required to reach the temperature at 130° C.). At the end of this time, the autoclave is cooled and the yarn skein removed, washed with tap water, and dried.

Color reduction is determined by reflectance measurements of the dyed yarn skeins utilizing a Photoelectric Reflection Meter (Model 610) manufactured by the Photovolt Corporation of New York. The degree of color reduction is calculated on the basis of reflectance values as compared to control sample values and is expressed in percent color loss.

As lignin dispersants, REAX 85 (a sodium salt of a sulfomethylated lignin product manufactured by Westvaco Corporation), Polyfon O (a sodium salt of a side-chain sulfonated lignin product manufactured by Westvaco Corporation), an ammonium lignosulfonate salt, and amine lignosulfonate salts produced by reaction of a methylolated lignin and triethanolamine (TEOA) or diethanolamine (DEOA) in accordance with my aforesaid pending U.S. patent application Ser. No. 06/859,384 were employed. Amounts of various of these lignin salts were added to the azo dyestuff slurries and modified as indicated by addition of EDTA in amounts of 0.05 mol/1,000 g lignin and contaminating copper metal ions in amounts of 0.025 mol/1,000 g lignin. The samples were employed in dyeing of Dacron yarn skeins by the test procedure outlined above, and results of azo dye reduction, as evidenced by light reflectance tests are presented in the following Table I.

TABLE I

| | | DYE SYSTEM (pH 5) | | | |
|---|---|---|---|---|---|
| SAMPLE # | AZO DYE (0.1 g) | LIGNOSULFONATE DISPERSANT (1 g) | EDTA | METAL CONTAMINATION | AIR ATMOS. AZO DYE REDUCTION (%) |
| 1 | C.I. Blue 79 | None | None | None | 0 |
| 2 | C.I. Blue 79 | REAX 85 | None | None | 46 |
| 3 | C.I. Blue 79 | REAX 85 | None | $Cu^+$ | 100 |
| 4 | C.I. Blue 79 | REAX 85 | Yes | $Cu^+$ | 65 |
| 5 | C.I. Blue 79 | None | Yes | $Cu^+$ | 11 |
| 6 | C.I. Blue 79 | POLYFON O | None | None | 17 |
| 7 | C.I. Blue 79 | POLYFON O | None | $Cu^+$ | 97 |
| 8 | C.I. Blue 79 | POLYFON O | Yes | $Cu^+$ | 87 |
| 9 | C.I. Blue 79 | AMMONIUM SALT | No | No | 3.9 |
| 10 | C.I. Blue 79 | AMMONIUM SALT | No | $Cu^+$ | 92 |
| 11 | C.I. Blue 79 | AMMONIUM SALT | Yes | $Cu^+$ | 59 |
| 12 | C.I. Blue 79 | AMINE SALT (TEOA) | No | No | 1.4 |
| 13 | C.I. Blue 79 | AMINE SALT (TEOA) | No | $Cu^+$ | 89 |
| 14 | C.I. Blue 79 | AMINE SALT (TEOA) | Yes | $Cu^+$ | 1.4 |
| 15 | C.I. Red 73 | None | None | None | 0 |
| 16 | C.I. Red 73 | REAX 85 | None | None | 80 |
| 17 | C.I. Red 73 | REAX 85 | None | $Cu^+$ | 93 |
| 18 | C.I. Red 73 | REAX 85 | Yes | $Cu^+$ | 92 |
| 19 | C.I. Red 73 | AMINE SALT (TEOA) | None | None | 8.6 |
| 20 | C.I. Red 73 | AMINE SALT (TEOA) | None | $Cu^+$ | 39 |
| 21 | C.I. Red 73 | AMINE SALT (TEOA) | Yes | $Cu^+$ | 9.5 |
| 22 | C.I. Red 73 | AMINE SALT (DEOA) | None | None | 49 |
| 23 | C.I. Red 73 | AMINE SALT (DEOA) | None | $Cu^+$ | 68 |

TABLE I-continued

| SAMPLE # | AZO DYE (0.1 g) | DYE SYSTEM (pH 5) LIGNOSULFONATE DISPERSANT (1 g) | EDTA | METAL CONTAM-INATION | AIR ATMOS. AZO DYE REDUCTION (%) |
| --- | --- | --- | --- | --- | --- |
| 24 | C.I. Red 73 | AMINE SALT (DEOA) | Yes | Cu$^+$ | 41 |

From the data presented in the foregoing table, it can be seen that for each azo dye tested (C.I. Blue 79 or C.I. Red 73) the use of sodium, ammonium, and amine lignosulfonates as dispersants in azo dye compositions increases azo dye reduction and color loss (Samples 2, 6, 9 & 12 or Samples 16, 19 & 22) over a control dye sample (Sample 1 or Sample 15) wherein no dispersant is employed. Further, it can be observed that the presence of copper impurities in the azo dye samples employing the sodium, ammonium, and amine lignosulfonate salts further greatly increases the azo dye reduction (Samples 3, 7, 10, & 13 or Samples 17, 20 & 23). The addition of EDTA to the azo dye-containing sodium and ammonium dispersants lessen azo dye reduction somewhat, but not appreciably (Samples 4, 8, 11 & 18).

However, it can be seen that the combined use of the amine salt lignosulfonate dispersant and the EDTA in each of the azo dye compositions (Sample 14 or Samples 21 & 24) substantially alleviates azo dye reduction by the lignosulfonate dispersant in the presence of copper metal contamination.

Naturally, the amount of EDTA (per 1,000 g lignin) employed in the dye system to alleviate azo dye reduction is dependent upon the amount of soluble copper impurities present in the system. The EDTA should be added in a molar amount at least equal to the molar amount of soluble copper present per 1,000 g of lignosulfonate. The preferred range of EDTA addition is from 1 to 4 molar amounts for each molar amount of copper. Increased quantities of EDTA beyond realistic levels will not significantly alleviate the azo dye reduction which the copper catalyzes with sensitive azo dye structures.

TABLE II

| Azo Dye Reduction (%) Effects of Varying EDTA on Cu$^+$ Contaminated Low Sulfonated Lignin at pH 5 on Disperse Blue 79 Dyestuff (Without Air)* | | | | | |
| --- | --- | --- | --- | --- | --- |
| Amine Salt Sulfon. Lignin | Amine Salt Sulfon. Lignin + Cu | Amine Salt Sulfon. Lignin + Cu$^+$ + EDTA (0.01 M) | Amine Salt Sulfon. Lignin + Cu$^+$ + EDTA (0.025 M) | Amine Salt Sulfon. Lignin + Cu$^+$ + EDTA (0.1 M) | Amine Salt Sulfon. Lignin + Cu$^+$ + EDTA (0.5 M) |
| 1.3 | 59 | 56 | 12 | 1.4 | 1.3 |

The data in Table II show that as the molar amount (per 1,000 g lignosulfonate) of EDTA is increased from less than ¼ (0.01M) to 1 (0.025M) to 4 (0.1M) to 20 (0.5M) times the molar amount of Cu$^+$ (per 1,000 g lignosulfonate), the addition of EDTA above about 4 times the molar amount of copper does not appreciably improve azo dye reduction for costs involved.

That which is claimed is:

1. A dispersant composition for an azo dye system contaminated with soluble copper impurities comprising an amine lignosulfonate salt and ethylenediaminetetraacetic acid.

2. The composition of claim 1 wherein the ethylenediaminetetraacetic acid is present in at least an equal molar amount to each molar amount of the soluble copper per 1,000 grams of the lignosulfonate.

3. The composition of claim 2 wherein the ethylenediaminetetraacetic acid is employed in an amount of about 1 to about 4 moles for each molar amount of the copper present per 1,000 grams of lignosulfonate.

4. An improved azo dye system contaminated with soluble copper impurities comprising a lignosulfonate salt dispersant and ethylenediaminetetraacetic acid wherein the improvement comprises improved azo group stability and reduced color loss by employing as the lignosulfonate dispersant an amine lignosulfonate salt.

5. The improved azo dye system of claim 4 wherein the ethylenediaminetetraacetic acid is present in at least an equal molar amount to the molar amount of soluble copper present per 1,000 grams of the lignosulfonate.

6. The improved azo dye system of claim 5 wherein the ethylenediaminetetraacetic acid is employed in an amount of about 1 to about 4 moles for each molar amount of the copper present per 1,000 grams of lignosulfonate.

7. An improved method dyeing materials with dye systems comprising azo dyestuffs, ethylenediaminetetraacetic acid, a lignosulfonate salt and soluble copper impurities, wherein the improvement comprises alleviating the azo dye reduction effect of the copper and lignosulfonate salt by employing as the lignosulfonate salt an amine salt of a lignosulfonate in conjunction with the ethylenediaminetetraacetic acid in sufficient amounts to sequester the soluble copper impurities.

8. A method of preparing an improved dyestuff composition for use in dyeing materials in the presence of soluble copper contaminants, comprising combining an azo dyestuff, an amine salt of a sulfomethylated lignin, and ethylenediaminetetraacetic acid.

9. The improved method of claim 8 wherein the amine salt of the lignosulfonate dispersant is prepared by reaction of a methylolated lignin with triethanolamine and sulfur dioxide.

10. The improved method of claim 7 wherein the ethylenediaminetetraacetic acid is present in at least an equal molar amount to the molar amount of soluble copper present per 1,000 grams of the lignosulfonate.

11. The improved method of claim 8 wherein the ethylenediaminetetraacetic acid is employed in an amount of about 1 to about 4 moles for each molar amount of the copper present per 1,000 grams of lignosulfonate.

12. The improved method of claim 9 wherein the ethylenediaminetetraacetic acid is present in at least an equal molar amount to the molar amount of soluble copper present per 1,000 grams of the lignosulfonate.

13. The improved method of claim 12 wherein the ethylenediaminetetraacetic acid is employed in an amount of about 1 to about 4 moles for each molar amount of the copper present per 1,000 grams of lignosulfonate.

* * * * *